United States Patent
Kozat et al.

(10) Patent No.: US 9,713,077 B2
(45) Date of Patent: Jul. 18, 2017

(54) METHOD AND APPARATUS FOR DISTRIBUTING HANDOFF CONTROL IN WIRELESS NETWORKS VIA PROGRAMMABLE BLACK AND WHITE LISTS

(71) Applicant: ARGELA-USA, INC., Sunnyvale, CA (US)

(72) Inventors: Ulas Can Kozat, Mountain View, CA (US); Mehmet Oguz Sunay, San Francisco, CA (US)

(73) Assignee: NETSIA, INC., Sunnyvale, CA (US)

( * ) Notice: Subject to any disclaimer, the term of this patent is extended or adjusted under 35 U.S.C. 154(b) by 0 days.

(21) Appl. No.: 15/178,531

(22) Filed: Jun. 9, 2016

(65) Prior Publication Data

US 2016/0381627 A1  Dec. 29, 2016

Related U.S. Application Data

(60) Provisional application No. 62/184,181, filed on Jun. 24, 2015.

(51) Int. Cl.
*H04W 36/00* (2009.01)
*H04W 48/16* (2009.01)
(Continued)

(52) U.S. Cl.
CPC ............ *H04W 48/16* (2013.01); *H04W 8/18* (2013.01); *H04W 36/36* (2013.01); *H04W 36/38* (2013.01); *H04W 36/385* (2013.01); *H04L 67/30* (2013.01)

(58) Field of Classification Search
CPC ... H04W 48/16; H04W 36/385; H04W 36/36; H04W 8/18; H04W 36/38; H04L 67/30
See application file for complete search history.

(56) References Cited

U.S. PATENT DOCUMENTS

8,588,790 B2   11/2013   Cho et al.
8,948,767 B2   2/2015    Sridhar et al.
(Continued)

*Primary Examiner* — Ajit Patel
(74) *Attorney, Agent, or Firm* — IP Auhority, LLC; Ramraj Soundararajan (57) ABSTRACT

A hierarchy of controllers that are part of a communication network include: (1) a network controller at the top of the hierarchy having direct access to at least one subscription profile, $Profile_{UE}$, associated with at least one User Equipment (UE), (2) a radio access network (RAN) controller located at a level directly beneath the network controller receiving the subscription profile, $Profile_{UE}$, from the network controller, (3) a base station controller associated with a base station and located beneath the RAN controller in the hierarchy, (4) a UE controller associated with an UE located beneath the base station controller in the hierarchy. The RAN controller, based on information in the received subscription profile, $Profile_{UE}$, delegates handoff decisions to either the base station controller or the UE controller, and the RAN controller makes such delegation decisions by programming a per UE White List ($WL_{UE}$) and a per UE Black List ($BL_{UE}$), the $WL_{UE}$ comprising a programmable list of candidate base stations with which the UE is permitted to conduct handoff operations, and the $BL_{UE}$ comprising another programmable list of base stations with which the UE is not permitted to conduct handoff operations.

23 Claims, 3 Drawing Sheets

(51) Int. Cl.
  *H04W 36/38*  (2009.01)
  *H04W 36/36*  (2009.01)
  *H04W 8/18*   (2009.01)
  H04L 29/08    (2006.01)

(56) References Cited

U.S. PATENT DOCUMENTS

2008/0049702 A1\* 2/2008 Meylan ................. H04W 48/20
                                                     370/342
2012/0040636 A1\* 2/2012 Kazmi .................... H04W 4/22
                                                     455/404.2
2013/0077482 A1   3/2013 Krishna et al.
2014/0073303 A1\* 3/2014 Henderson ............ H04W 16/00
                                                     455/418

\* cited by examiner

METHOD AND APPARATUS FOR DISTRIBUTING HANDOFF CONTROL IN WIRELESS NETWORKS VIA PROGRAMMABLE BLACK AND WHITE LISTS

RELATED APPLICATIONS

This application claims benefit of U.S. Provisional Application 62/184,181 filed Jun. 24, 2015.

BACKGROUND OF THE INVENTION

Field of Invention

The present invention relates generally to an apparatus and method for wireless networks, more specifically towards programmable distribution of handoff control, which comprises controlling how wireless devices handoff between different base stations and/or access points.

Discussion of Related Art

Controlling how wireless devices associate with which wireless access points and/or base stations is an essential part of any wireless network that supports device mobility in and out of the network as well as within the network. Wireless handoffs allow a mobile user equipment (UE) to move from a current wireless access point or base station to a targeted wireless access point or base station. In general, the handoff decision can be taken by the network with or without using the measurements from the UE, or it can be taken by the UE.

In Long Term Evolution (LTE) networks, UE reports the signal strength measurements from the current base station as well as the neighboring base stations to its current base station. Based on these reported signal strengths, if the signal quality at the current base station drops below a certain threshold and the signal quality at another base station raises above a certain threshold, the other base station becomes a candidate base station. Among the candidate base stations, the current base station picks the target base station and initiates an admission control procedure by sending a handoff request to the target base station. Target base station can either admit the handoff request or deny it based on its current load. If admitted, the current base station informs the UE to disconnect from the current base station and reconnect to the target base station.

In WiFi networks, UEs monitor the available WiFi networks and initiate the association request based on the locally available WiFi profiles. Any reassociation decision to another WiFi network is taken by the UE. Mobility among the access points of the same WiFi SSID is handled seamlessly as there is no need for explicit time synchronization. UEs keep a dynamic list of WiFi networks that they can attach with. The list can be generated and modified by the owner of the device. Trusted third parties such as network operators or over the top service providers can also configure this list. Using standard solutions such as 802.11u, UEs can acquire information about which WiFi access points they can connect to dynamically as they roam before they make an attachment decision. Access Network Query Protocol (ANQP) provides the signaling framework between UE and WiFi APs to reach trusted servers to exchange information about the WiFi access in the current location of UE.

Access Network Discovery & Selection Function (ANDSF) is another standards based solution (3GPP TS 24.312) that sets the priorities of different access schemes on a per UE or per IP flow basis depending on the device capabilities (e.g., whether it can support multiple interfaces at the same time or only one interface at a time). Time of day, location, and application type are among the few conditions that can be used to set different prioritization across access networks.

In 2G and 3G CDMA networks, UEs attach to multiple base stations at the same time using different spreading codes and can receive the same data simultaneously from multiple base stations. Base stations that UE receives from form a dynamic set, and based on the quality of signals, new base stations are added or existing base stations are removed from said set.

Cooperative Multi-Point Transmission (COMP) techniques are part of LTE networks, where same or distinct payloads can be transmitted simultaneously from multiple LTE base stations using the same or distinct resource blocks.

In publication US 20130077482 A1, inventors disclose a method of handoff between a cellular base station and a collocated WiFi access point. The method collects information related to the cellular network and the WiFi network that comprises collecting real time performance data of the cellular and the WiFi network at the cellular base station and at the WiFi access point, wherein the real time performance data includes one or more of the following: a level of traffic congestion, a degree of latency, a level of throughput, and a load-balancing metric. Further network cost and operator policies are also considered as part of this handoff decision.

In U.S. Pat. No. 8,588,790 B2, inventors disclose a handoff method that decides not to handoff a UE from a macro cell to a small cell based upon the speed of the UE. If no handoff is requested by UE, macro cell assigns a macro cell only resource block to the UE while UE is residing inside the small cell area.

In U.S. Pat. No. 8,948,767 B2, inventors make cell reselection/handoff parameters such as hysteresis parameters, time-to-trigger (TTT) values, offset parameter, etc. programmable on a per small cell and UE basis by collecting the counts of cell reselection/handoff between a particular small cell and a particular macro cell and adapting the cell reselection/handoff parameters based if these counts exceed a threshold determined by the handoff management function.

Embodiments of the present invention are an improvement over prior art systems and methods.

SUMMARY OF THE INVENTION

Unlike the prior art, the current disclosure does not detail methods for handoff decisions, i.e., when a UE should handoff from one base station/access point to another. The present invention provides a hierarchy of controllers located at the UE, base station/access point, and radio access network (RAN), only one of which takes a handoff decision for a given UE at a particular time. At the top of the hierarchy, RAN controller takes the handoff decisions by default. If RAN controller delegates the handoff decision for a particular UE to one or more base stations/access points, then the current base station/access point that the said UE has connection/association with takes the handoff decisions for the said UE. If the current base station/access point delegates to the UE, then UE itself autonomously takes its own handoff decisions.

The present invention also provides a method such that controllers at each level of the hierarchy can delegate the handoff control to and revoke the handoff control at the controllers lower in the hierarchy. Invention provides a method that controllers perform delegation and revocation with respect to a policy, which itself can be set programmatically by a network controller or a function within Business Support Services (BSS) or Operation Support Services (OSS). Policy dictates under what network conditions (i.e., states), each controller is responsible for the handoff decisions for a given UE. The network states can be many different things including wireless network topology, UE speed, UE battery power, UE traffic type (e.g., VoIP, live video, on-demand video, web surf, etc.), UE subscription level, UE capability (e.g., support for dual connectivity), base station/access point congestion, RAN congestion, etc.

The method and apparatus disclosed by this invention combine the advantages of UE triggered and network triggered handoffs in one coherent programmable wireless architecture. When UEs decide on handoff, they can take very fast handoff decisions based on their local state, which can suddenly change (e.g., signal strengths from different base stations, UE velocity, UE orientation, traffic demand, etc.). This can facilitate handoff between small cells even when UE is moving fast. The main drawback of UE triggered handoffs is that it is not known a priori that the base station it is handing off to can admit this UE or not. The invention solves this problem by monitoring the resources of base stations and access points at the level of RAN controllers to dynamically create a white list of base stations each UE can handoff to with low likelihood of not being admitted. In addition, a black list of base stations is prepared for each UE. The UE cannot handoff to this black listed base station on its own. By programming these white and black lists on a per UE and per base station basis, RAN controllers can control how distributed or centralized handoff decisions are taken on a per UE basis conditioned on the network state. The more centralized decision increases the duration of handoff time, but ensures that UE hands off to a base station with admission guarantees and load balancing or network utilization is done more optimally.

In one embodiment, the present invention provides a hierarchy of controllers that are part of a communication network comprising: (1) a network controller at the top of the hierarchy having direct access to at least one subscription profile, $Profile_{UE}$, associated with at least one User Equipment (UE), (2) a radio access network (RAN) controller located at a level directly beneath the network controller receiving the subscription profile, $Profile_{UE}$, from the network controller, (3) a base station controller associated with a base station and located beneath the RAN controller in the hierarchy, (4) a UE controller associated with an UE located beneath the base station controller in the hierarchy, wherein the RAN controller, based on information in the received subscription profile, $Profile_{UE}$, delegates handoff decisions to either the base station controller or the UE controller, and wherein the RAN controller makes such delegation decisions by programming a per UE White List ($WL_{UE}$) and a per UE Black List ($BL_{UE}$), the $WL_{UE}$ comprising a programmable list of candidate base stations with which the UE is permitted to conduct handoff operations, and the $BL_{UE}$ comprising another programmable list of base stations with which the UE is not permitted to conduct handoff operations.

In another embodiment, the present invention provides a hierarchy of controllers that are part of a communication network comprising: (1) a network controller at the top of the hierarchy having direct access to at least one subscription profile, $Profile_{UE}$, associated with at least one User Equipment (UE), (2) a radio access network (RAN) controller located at a level directly beneath the network controller receiving the subscription profile, $Profile_{UE}$, from the network controller, (3) a base station controller associated with a base station and located beneath the RAN controller in the hierarchy; (4) a UE controller associated with an UE located beneath the base station controller in the hierarchy, wherein the RAN controller, based on: (A) first information in the received subscription profile, $Profile_{UE}$, and (B) second information comprising any of, or a combination of, the following: application profile, network topology, traffic flows, and congestion information at different parts of the communication network, delegates handoff decisions to either the base station controller or the UE controller, and wherein to the RAN controller makes such delegation decisions by programming a per UE White List ($WL_{UE}$) and a per UE Black List ($BL_{UE}$), the $WL_{UE}$ comprising a programmable list of candidate base stations with which the UE is permitted to conduct handoff operations, and the $BL_{UE}$ comprising another programmable list of base stations with which the UE is not permitted to conduct handoff operations.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

In one embodiment, a hierarchy of controllers in the network and wireless devices trigger the handoff procedures based on the network state, UE state, network traffic, and conditions set by the controllers upper in the hierarchy. In a typical embodiment, network controllers at the top of the controller hierarchy have direct access to the subscription profiles of UEs, application profile, network topology, traffic flows, and congestion information at different parts of the network. Network controller (14 in FIG. 1) based on this aforementioned information provides user profiles (Profile$_{UE}$ in FIG. 1) to RAN controller (13 in FIG. 1). Profile$_{UE}$ summarizes the conditions to assist RAN controller for delegating the handoff decisions to the base station controller (12 in FIG. 1) and UE controller (11 in FIG. 1).

At each level of hierarchy, there can be more than one controller that peer with each other. Peers can have direct interfaces with each other to provide a logically centralized tier of controllers. In another embodiment, peers have no direct interface with each other and each peer is constrained separately by one or more controllers upper in the hierarchy. Yet, in another embodiment, some tiers can have direct interfaces with each other to provide a single logically centralized view and some tiers may have no direct interfaces (e.g., network controllers can be logically centralized while the other controllers are not).

In one embodiment, network controllers can push Profile$_{UE}$ to RAN controllers, in another embodiment RAN controllers can pull the user profiles from the network controllers.

User subscription profile information includes but is not limited to the service level agreement between the service provider and the user who owns the device. It sets different grades for different users, but it also sets different grades for the applications/services users are consuming. For instance, if a user is subscribed to a carrier bundled voice over IP (VoIP), video conferencing, or any other service, the said user receives higher quality guarantees for these services than a default QoS bearer would provide by prioritizing the packets of these traffic flows within the network.

Application profile is typically used to assess the quality requirements of the application traffic as well as its capabilities independent of the user subscription profiles. These profiles can be specified with an explicit agreement between an over-the-top (OTT) service provider and the network operator. It can also be defined by the operator itself by defining different application categories and classify each traffic flow in the network with respect to these categories online (e.g., through inspecting packet headers, deep packet inspection, or using packet statistics without inspecting the contents).

Combination of user subscription profile and application profile are used in modern cellular networks to create Traffic Flow Templates. Flows are matched on Traffic Flow Templates (TFT) at ingress points for the flows (i.e., packet gateways for downlink traffic and UE for uplink traffic) and assigned a Diffsery Code Point (DSCP) in the IP header to receive differentiated services along the traffic route. Such implementations define methods and apparatus to handle the traffic flows in the user plane. As such, they are complementary to this invention.

This invention utilizes user subscription profiles and application profiles to dictate how the control plane is managed for a given traffic flow in the network. Profile$_{UE}$ is similar to the TFTs, but instead of mapping the flows into quality of service (QoS) classes in the forwarding plane, Profile$_{UE}$ sets one or more attributes of UEs based on which each UE receives a differentiated treatment in the control plane.

In one embodiment, the attributes can be represented by a list of {key, value} pairs, where key refers to the attribute name and value refers to the attribute value, which can be numeric or string value.

Profile$_{UE}$ must include UE identity as one of the keys. The value must be unique for each UE. Reserved values can be used to signify all UEs or a group of UEs.

Profile$_{UE}$ typically includes UE priority as one of the keys. The priority value is set dynamically since the network controller can change the priority level of UEs as the network state, UE state, application and user subscription profiles evolve. Target base station, where UE handoffs to, always admits a high priority UE at the expense of possibly preempting a lower priority UE. Thus, a higher priority level in the control plane also allows for more flexibility to place control plane functions and move them closer to the mobile device in the controller hierarchy. As a commonly occurring example, when a UE only performs web browsing, it can be initially set as low priority. Thus, handoff decisions can be handled by the RAN controller with more centralized control. When the same UE starts a bundled VoIP application, UE priority can be set to the highest giving freedom to the RAN controller and base station controller to delegate the handoff decisions to the controllers lower in the hierarchy than themselves. Whether to delegate or not, depends on the other information conveyed in Profile$_{UE}$. When the said VoIP session ends, the UE can be returned to the default priority.

Profile$_{UE}$ includes UE mobility as another optional key, which can take values such as "very high", "high", "medium", "low", and "stationary". For instance very high category can represent high speed trains, high can be highway vehicular speeds, medium can be urban vehicular speeds, low can be pedestrian, and stationary can be non-moving UEs. Network controller can set this type by combining several reports by the UE (e.g., positioning), network (e.g., location tracking), and services (e.g., a map service). As in the case of priority, the UE mobility is also subject to change as UE can switch from one mobility state to another. Unlike the UE priority, a high or low UE mobility on its own does not encourage or discourage handoff delegation.

Profile$_{UE}$ includes UE flow info as another optional key that provides a list of two-tuples {flow-match, delivery mode}, where flow match represents another list of packet headers with specific values and delivery mode can be one of the following: "in-order & lossy", "in-order & non-lossy", "out-of-order & lossy" and "out-of-order & non-lossy". For instance, if UE 22 in FIG. 2 has two flows one using UDP with destination port number port-1 and the other using TCP with destination port number port-2, network controller can set "out-of-order & lossy" for the flow matched by UE IP address and port-1, while it can set "in-order & lossless" for the flow matched by UE IP address and port-2.

Profile$_{UE}$ includes Connectivity Mode as another optional key that provides supported mode of dual connectivity by the UE. If UE can simultaneously communicate over two or more wireless interfaces, each of these interfaces can be differentiated in delegation decisions as maybe one interface can be used as a more stable connection and the other interface(s) can be used more opportunistically.

RAN controller combines UE priority, UE mobility, UE flow info, connectivity mode, its locally available network state, and its own load to make delegation decisions. Delegation decisions can be simple (e.g., via explicit rules) or complex (e.g., via machine learning techniques). One rule example can be in the form: When UE mobility is very high and there are candidate target base stations that admits new users at UE priority and UE has no flows with delivery mode "in-order & non-lossy", then delegate the handoff decisions to the base station controller. Another rule can be solely based on the load of RAN controller such that when the load of RAN controller exceeds a critical utilization level, it delegates the handoff decisions. In dual connectivity scenarios, RAN controller can delegate the control of one interface to the controllers lower in the hierarchy and keep the control of the other interface to provide a higher guarantee of connectivity.

Figure 1:
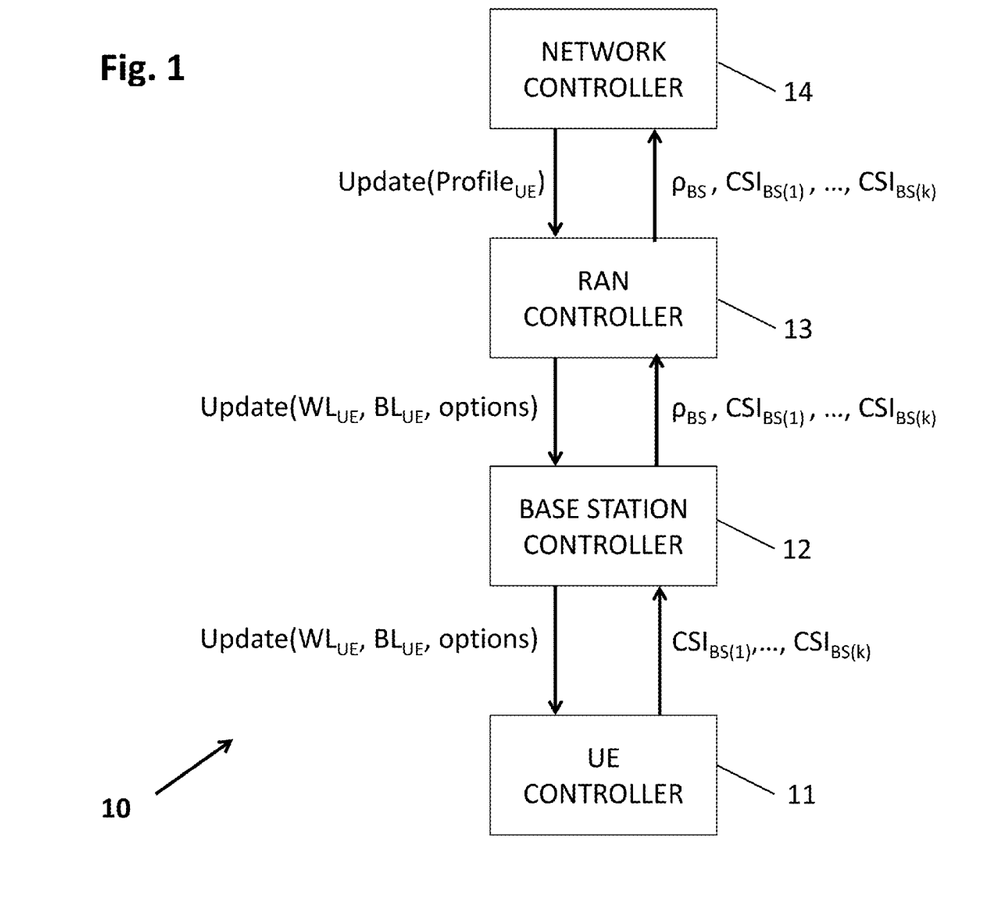
FIG. 1 illustrates the hierarchy of controllers according to the teachings of the present invention's communication architecture.

RAN controller makes the delegation decisions by sending/updating per UE White List ($WL_{UE}$) and per UE Black List ($BL_{UE}$) as well as specifying optional parameters that define the conditions under which delegation is granted. As depicted in FIG. 1, RAN controller can pass $WL_{UE}$, $BL_{UE}$, and options (i.e., optional parameters) to BS controller, which then can further constrain them before passing to UE controller. In some deployment scenarios, RAN controller can directly pass $WL_{UE}$, $BL_{UE}$, and options to the UE controller.

Figure 3:
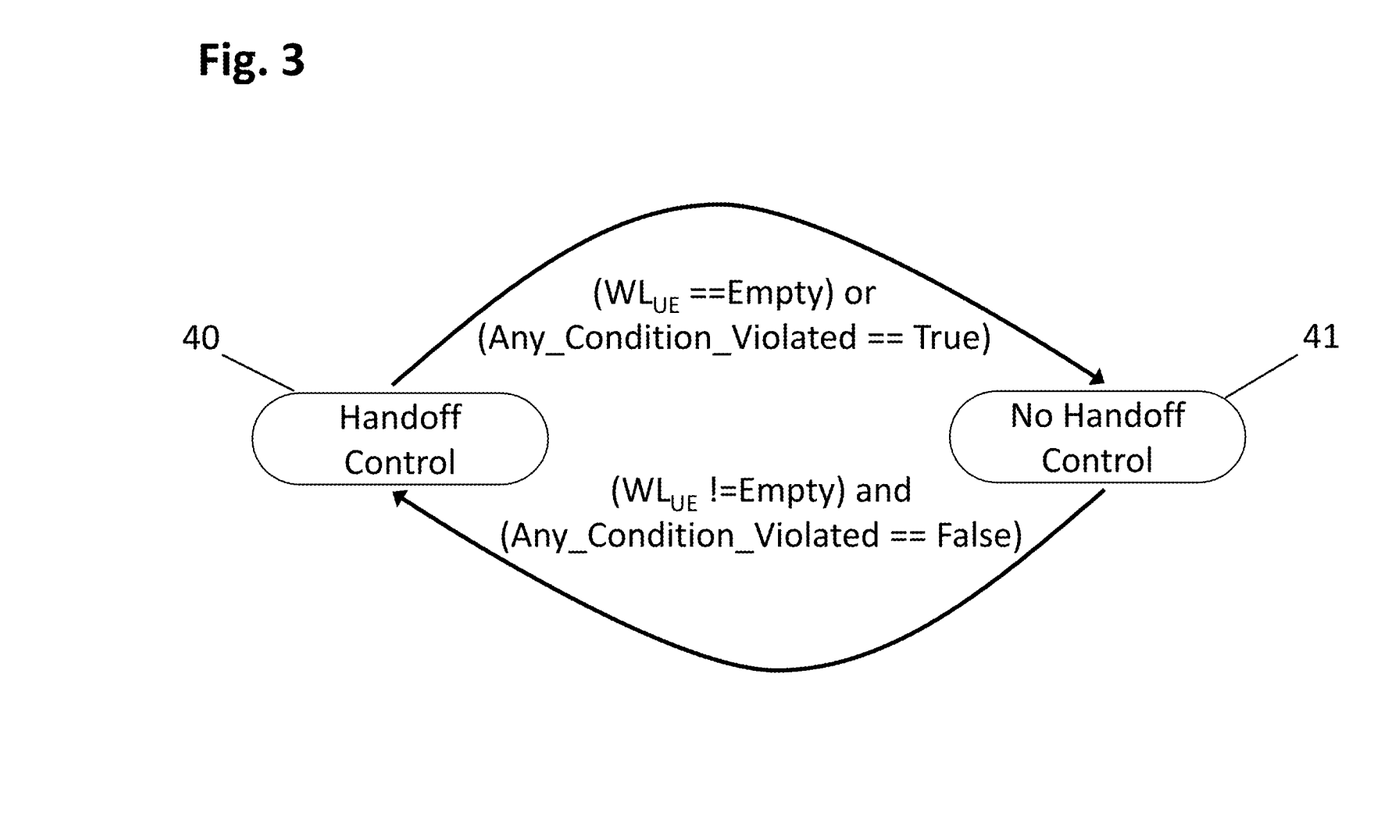
FIG. 3 illustrates per UE state machine for the UE controller and base station controller instances.

FIG. 3 shows the two states BS controller and UE controller can be to determine whether they are in the Handoff Control or No Handoff Control states. When in Handoff Control state for a particular UE, BS controller or UE controller autonomously makes the handoff decision and starts the procedure for UE to detach from the current base station to attach to the target base station. While in Handoff Control state, if RAN controller updates the $WL_{UE}$ to an empty set, BS controller and UE controller transitions into the No Handoff Control state. If any local conditions are violated whose rules are set according to the optional parameters passed by the RAN controller, again BS controller and UE controller transitions into the No Handoff Control state. In a normal execution stage, a controller lower in the hierarchy can be in the Handoff Control state if and only if all the controllers higher in the hierarchy are also in Handoff Control state. Thus, RAN controller always stays in the Handoff Control state. In other words, even if a controller lower in the hierarchy does not decide to initiate a handoff procedure, its predecessor controllers in the hierarchy can initiate the handoff procedure. When in No Handoff Control state, if $WL_{UE}$ is updated to a non-empty set, BS controller or UE controller can transition into Handoff Control state provided that none of the conditions as set by the optional parameters are violated.

$WL_{UE}$ is a dynamic set that lists candidate base stations to which UE is allowed to handoff. In one embodiment, there are no restrictions to handoff a given UE to any of the base stations in the $WL_{UE}$. In another embodiment, each base station in $WL_{UE}$ is assigned a weight factor that can represent the current utilization level, likelihood of being admitted, preferred ranking for hand off decisions, etc. In a typical usage scenario, RAN controller knows the capacities of each base station, switch, and links in the radio access network and monitors the loading of each node and link regularly or by listing event reports triggered after certain events occur, such as when load exceeds a certain threshold. RAN controller also knows the neighborhood relations of the base stations, thus knows all possible candidates that UE can handoff to given the base station UE is attached to. Therefore, RAN controller can set these weights by taking into account one or more objectives. One objective is to load balance the base stations. Another objective can be to minimize the likelihood of dropping the connection. Another objective can be to maximize the rate delivered to the UE.

$BL_{UE}$ is a dynamic set of base stations to which UE cannot handoff. Black listed base stations for a given UE is added to $BL_{UE}$ at BS controller and UE controller, when update messages are received from the controllers up in the hierarchy. In a typical implementation $BL_{UE}$ in BS controller and UE controller conforms to a certain degree of consistency (e.g., strongly consistent or eventually consistent).

In one embodiment, base stations added to $BL_{UE}$ are removed from $WL_{UE}$ if they are part of the UE specific white list. In another embodiment, black listed base stations are not removed from $WL_{UE}$. In this latter case, $WL_{UE}$ works more like a candidate base stations reflecting topological constraints and $BL_{UE}$ is used to block handoffs to a subset of base stations in $WL_{UE}$.

BS controller uses the same mechanisms as the RAN controller to delegate handoff control to the UE controller by specifying $WL_{UE}$, $BL_{UE}$, and optional parameters. The delegation to UE controller is more strictly defined in the sense that $WL_{UE}$ at the UE controller would be a subset of $WL_{UE}$ at the BS controller, $BL_{UE}$ at the UE controller would be a superset of $BL_{UE}$ at the BS controller, and optional parameters define a more narrow margin of decision making at UE controller than the BS controller. For instance, RAN controller can set a first signal strength low threshold ($SSLT_1$) for the BS controller which triggers handoff decision at the BS controller, if signal strength reporting by the UE drops below this level. BS controller (or RAN controller) can set a second signal strength low threshold ($SSLT_2$) that is larger than $SSLT_1$ for the UE controller. Thus, UE controller can be more responsive to the handoff decisions based on signal strength measurements from the service base station.

FIG. 1 depicts the main apparatus of the invention, a hierarchical set of controllers in a mobile network with specific interfaces for role delegations. From the top to bottom of hierarchy, there are four controller levels: network controller (14), radio access network (RAN) controller (13), base station (BS) controller (12), and user equipment (UE) controller (11). Each of these controllers is implemented in software over commodity or custom hardware and operating system. In a typical embodiment, these controllers are implemented as logically separated modules. In one part of the network, the logically separate modules can be also physically separated. In another part of the network, they can be physically collocated. For instance, 12, 13, and 14 can be all running in the same physical or virtual server on a base station node, on a Telco grade server, or in a remote data center. They can be also running on physically separate, geographically distributed servers or network nodes. Yet, in another embodiment, some of these controllers can be combined together in one logical entity reducing the number of levels in the controller hierarchy. For instance, RAN controller and BS controller can be implemented as one controller without requiring the interfaces between the RAN controller and BS controller as in FIG. 1, while supporting the interfaces between 14 and 13 as well as between 12 and 11.

In FIG. 1, handoff decisions for a UE can be taken by one of RAN controller, BS controller, or UE controller. Which entity is responsible for a particular handoff decision is constrained first by the network controller (14) as it updates the UE profile (i.e., $Profile_{UE}$) at RAN controller (13). $Profile_{UE}$ includes at least the priority level of the UE and in general what quality of service the UE is currently subject to. Network controller can dynamically adjust the priorities or QoS class of a UE based on this UE's current subscription level, its current traffic flows, presence of other active UEs in the same RAN and the current traffic flows of these UEs. Network controller can get this information from other entities (e.g., network functions, forwarding elements, shared database, etc.). Network controller can also receive feedback from the other controllers lower in the hierarchy. In FIG. 1, 13 receives resource utilization per base station ($\rho_{BS}$) and channel state information (CSI) measured by each UE for the UE's current serving base station and each neighboring base station (up to the limit the radio interface allows for). In FIG. 1, UE controller (11) collects signal strength measurements for k base stations and reports these measurements in the form of channel quality indicator (CQI) or other forms (e.g., RSSI, RSRQ, RSRP, etc.). Base station controller (12) relays the CSI information received from UE controller (11) plus the resource utilization on its local base station unit ($\rho_{BS}$) to the RAN controller (13), which in turn reports both CSI information and $\rho_{BS}$ to the network controller.

In FIG. 1, RAN controller (13) either decides to control the handoff decision and its orchestration itself or delegates this control to the base station controller, which controls the base station that the user equipment currently attached to. The delegation decision is conveyed by updating the per UE white list ($WL_{UE}$), the per UE black list ($BL_{UE}$), and specifying the options for the delegated handoff. Per UE white list is a set of target base stations that UE can handoff to with low likelihood of not being admitted by the target base stations. Per UE black list is a set of target base stations to which UE is forbidden to handoff. Options in general set a list of parameters to identify the conditions/constraints of handoff delegation. One such option is the category of UE. If the category of UE belongs to a particular set of categories, base station controller (12) itself can delegate the handoff decision and trigger to the UE.

In FIG. 1, base station controller (12) uses $WL_{UE}$, $BL_{UE}$, and options to control UE handoff decisions. Base station controller (12) uses options being set by the RAN controller (13) or the default values if not explicitly set by the RAN controller (13) to determine the conditions under which it can itself decide when and where to handoff a given UE as well as the conditions under which it can delegate the handoff control to the UE controller.

In FIG. 1, UE controller (11) receives WL, BL, and options parameters from the base station controller (12) that establishes the local conditions and constraints for the UE controller to take handoff decisions and execute the handoff steps locally (e.g., detach from the current base station and attach to a base station in the set WL).

Figure 2:
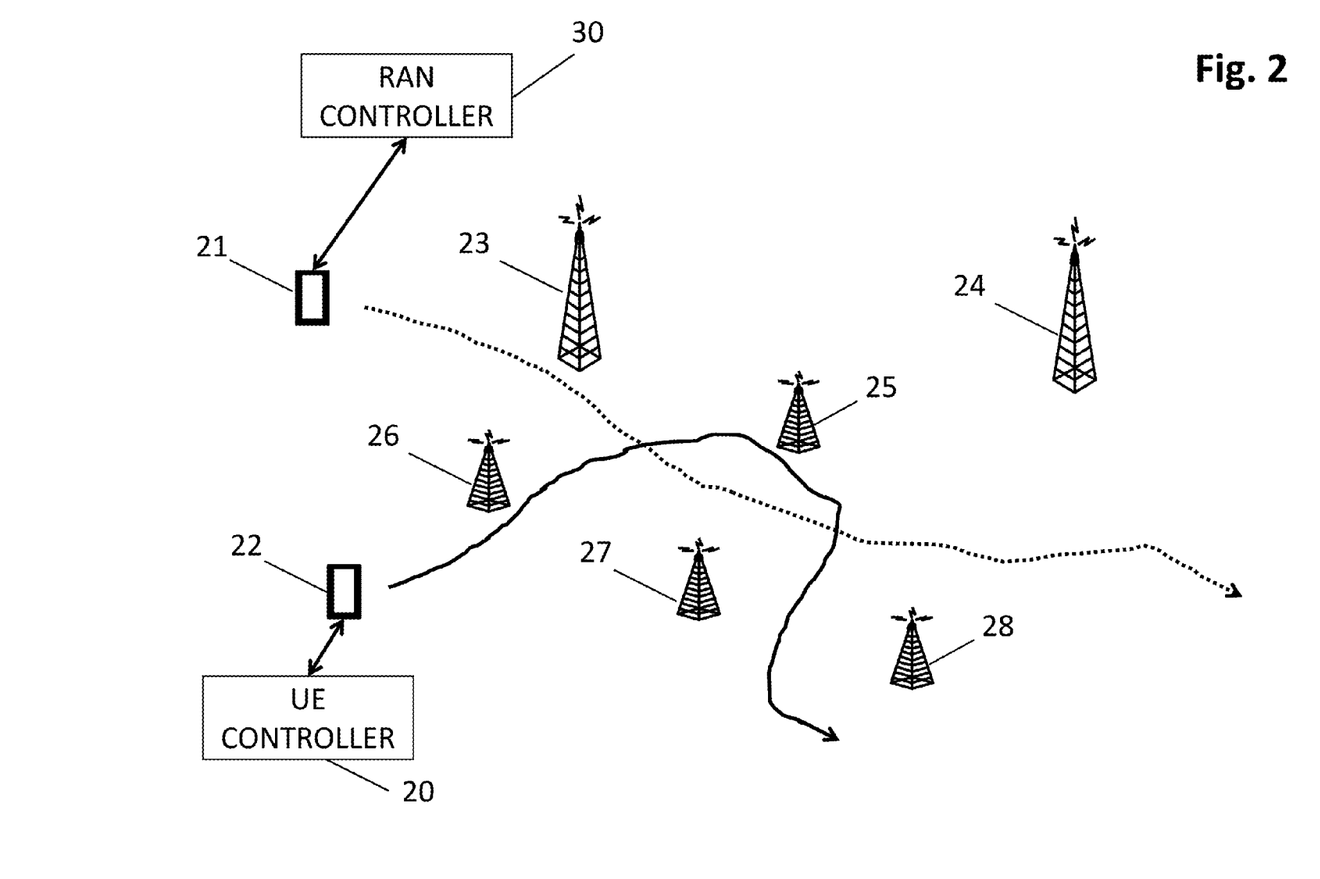
FIG. 2 illustrates how a handoff decision for one user equipment (UE) is handled by the RAN controller, while another handoff decision for another UE may be delegated to the UE controller that is collocated with the UE.

In FIG. 2, a heterogeneous network is depicted with macro cells (23, 24), small cells (25, 26, 27, 28), and two UEs (21, 22). The figure is provided as an example and actual number of base stations, their categories, user density, base station density, radio access technology, etc., would be different in a real world deployment. The purpose of this figure is to show that the handoff decisions for different UEs can be handled at a different level in the controller hierarchy. UE 22 follows the trajectory drawn by a solid curve and UE 21 follows the trajectory drawn by the dashed curve. The handoff decisions for UE 21 are handled by the RAN controller (30), whereas the handoff decisions for UE 22 are delegated to the UE controller (20) collocated with the user equipment. As a result, UE 22 can take autonomous handoff decisions and attach to macro cells and small cells very quickly. UE 21 sends channel measurements to the RAN controller, which in turn can run its own set of algorithms to decide when and where to handoff the UE 21. How the network handles the in transit packets forwarded to old locations for both UEs is determined based on the targeted quality of service for current traffic flows to UEs, which can be derived from subscription profiles.

FIG. 3 shows per UE state machine for UE controller and base station controller instances. By default, these controller instances start from "No Handoff Control" state (state 41 in FIG. 3) for a given UE. If UE specific white list ($WL_{UE}$) becomes non-empty at any moment and no condition is violated, then controller instance transitions into the "Handoff Control" state (state 40 in FIG. 3). Each condition to be checked for any violation is determined by the options set by the controllers upper in the hierarchy. For instance, UE velocity can be one option and if a lower and an upper threshold value are set, only if the UE velocity falls between said lower and upper thresholds, the condition is passed. Otherwise, velocity condition is violated and Any_Condition_Violated flag becomes true. When in state 40, controller instance transitions into state 41 as soon as $WL_{UE}$ becomes empty or Any_Condition_Violated flag becomes true. The triggers for these changes might be due to the new conditions and $WL_{UE}$ set by a controller instance higher in the hierarchy or any state change in the UE or base station based on the measurements reported by the controller instances at the same level or lower level in the hierarchy.

CONCLUSION

A system and method has been shown in the above embodiments for the effective implementation of a Method and Apparatus for Distributing Handoff Control in Wireless Networks via Programmable Black and White Lists. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

The invention claimed is:
1. A hierarchy of controllers that are part of a communication network comprising:
   a network controller at the top of the hierarchy having direct access to at least one subscription profile, Profile$_{UE}$, associated with at least one User Equipment (UE);
   a radio access network (RAN) controller located at a level directly beneath the network controller receiving the subscription profile, Profile$_{UE}$, from the network controller,
   a base station controller associated with a base station and located beneath the RAN controller in the hierarchy;
   a UE controller associated with an UE located beneath the base station controller in the hierarchy;
   wherein the RAN controller, based on information in the received subscription profile, Profile$_{UE}$, delegates handoff decisions to either the base station controller or the UE controller, and
   wherein the RAN controller makes such delegation decisions by programming a per UE White List ($WL_{UE}$) and a per UE Black List ($BL_{UE}$), the $WL_{UE}$ comprising a programmable list of candidate base stations with which the UE is permitted to conduct handoff operations, and the $BL_{UE}$ comprising another programmable list of base stations with which the UE is not permitted to conduct handoff operations.

2. The hierarchy of controllers of claim 1, wherein the RAN additionally utilizes any of, or a combination of, the following additional information to delegate handoff decisions: application profile, network topology, traffic flows, and congestion information at different parts of the communication network.

3. The hierarchy of controllers of claim 1, wherein at each level of hierarchy, more than one instance of each controller are present that peer with each other, with peers having direct interfaces with each other to provide a logically centralized tier of controllers.

4. The hierarchy of controllers of claim 1, wherein the $Profile_{UE}$ is pushed to the RAN controller from the network controller.

5. The hierarchy of controllers of claim 1, wherein the $Profile_{UE}$ is pulled by the RAN controller from the network controller.

6. The hierarchy of controllers of claim 1, wherein the $Profile_{UE}$ includes at least a service level agreement between a service provider and a user of UE, the service level agreement defining different grades for different users and/or different grades for applications/services the user is consuming.

7. The hierarchy of controllers of claim 1, wherein at least one attribute is defined in the $Profile_{UE}$, the attribute being represented by a list of {key, value} pair, where the key refers to name of the attribute and the value refers to the value of the attribute, the value being either a numeric value or a string value.

8. The hierarchy of controllers of claim 7, wherein the {key, value} pair is associated with the UE's identity, with either a unique value being associated with each UE, or a reserved value used to signify all UEs or a group of UEs.

9. The hierarchy of controllers of claim 7, wherein the {key, value} pair is associated with UE priority, where the value for UE priority is set dynamically according to any of, or a combination of the following: network state, UE state, application and user subscription profiles evolve.

10. The hierarchy of controllers of claim 7, wherein the {key, value} pair is associated with UE mobility, where the value for UE mobility is associated with speed of travel of the UE.

11. The hierarchy of controllers of claim 7, wherein the {key, value} pair is associated with UE flow information listed as {flow-match, delivery mode}, where flow match represents another list of packet headers with specific values and delivery mode can be one of the following: "in-order & lossy", "in-order & non-lossy", "out-of-order & lossy" and "out-of-order & non-lossy".

12. The hierarchy of controllers of claim 7, wherein the {key, value} pair is associated with connectivity mode that provides supported mode of dual connectivity by the UE.

13. A hierarchy of controllers that are part of a communication network comprising:
 a network controller at the top of the hierarchy having direct access to at least one subscription profile, $Profile_{UE}$, associated with at least one User Equipment (UE);
 a radio access network (RAN) controller located at a level directly beneath the network controller receiving the subscription profile, $Profile_{UE}$, from the network controller,
 a base station controller associated with a base station and located beneath the RAN controller in the hierarchy;
 a UE controller associated with an UE located beneath the base station controller in the hierarchy;
 wherein the RAN controller, based on
 (1) first information in the received subscription profile, Profile and
 (2) second information comprising any of, or a combination of, the following: application profile, network topology, traffic flows, and congestion information at different parts of the communication network,
 delegates handoff decisions to either the base station controller or the UE controller, and
 wherein the RAN controller makes such delegation decisions by programming a per UE White List ($WL_{UE}$) and a per UE Black List ($BL_{UE}$), the $WL_{UE}$ comprising a programmable list of candidate base stations with which the UE is permitted to conduct handoff operations, and the $BL_{UE}$ comprising another programmable list of base stations with which the UE is not permitted to conduct handoff operations.

14. The hierarchy of controllers of claim 13, wherein at each level of hierarchy, more than one instance of each controller are present that peer with each other, with peers having direct interfaces with each other to provide a logically centralized tier of controllers.

15. The hierarchy of controllers of claim 13, wherein the $Profile_{UE}$ is pushed to the RAN controller from the network controller.

16. The hierarchy of controllers of claim 13, wherein the $Profile_{UE}$ is pulled by the RAN controller from the network controller.

17. The hierarchy of controllers of claim 13, wherein the $Profile_{UE}$ includes at least a service level agreement between a service provider and a user of UE, the service level agreement defining different grades for different users and/or different grades for applications/services the user is consuming.

18. The hierarchy of controllers of claim 13, wherein at least one attribute is defined in the $Profile_{UE}$, the attribute being represented by a list of {key, value} pair, where the key refers to name of the attribute and the value refers to the value of the attribute, the value being either a numeric value or a string value.

19. The hierarchy of controllers of claim 18, wherein the {key, value} pair is associated with the UE's identity, with either a unique value being associated with each UE, or a reserved value used to signify all UEs or a group of UEs.

20. The hierarchy of controllers of claim 18, wherein the {key, value} pair is associated with UE priority, where the value for UE priority is set dynamically according to any of, or a combination of the following: network state, UE state, application and user subscription profiles evolve.

21. The hierarchy of controllers of claim 18, wherein the {key, value} pair is associated with UE mobility, where the value for UE mobility is associated with speed of travel of the UE.

22. The hierarchy of controllers of claim 18, wherein the {key, value} pair is associated with UE flow information listed as {flow-match, delivery mode}, where flow match represents another list of packet headers with specific values and delivery mode can be one of the following: "in-order & lossy", "in-order & non-lossy", "out-of-order & lossy" and "out-of-order & non-lossy".

23. The hierarchy of controllers of claim 18, wherein the {key, value} pair is associated with connectivity mode that provides supported mode of dual connectivity by the UE.

* * * * *

UNITED STATES PATENT AND TRADEMARK OFFICE
CERTIFICATE OF CORRECTION

PATENT NO. : 9,713,077 B2  
APPLICATION NO. : 15/178531  
DATED : July 18, 2017  
INVENTOR(S) : Ulas Can Kozat and Mehmet Oguz Sunay Page 1 of 1

It is certified that error appears in the above-identified patent and that said Letters Patent is hereby corrected as shown below:

In the Claims

Column 12, Line 3, please delete "Profile" and insert therefore --Profile$_{UE}$--.

Signed and Sealed this  
Sixth Day of November, 2018

Andrei Iancu  
*Director of the United States Patent and Trademark Office*